A. Bugnion
E. Dégallier
INVENTORS

By: Marks & Clerk
ATTYS

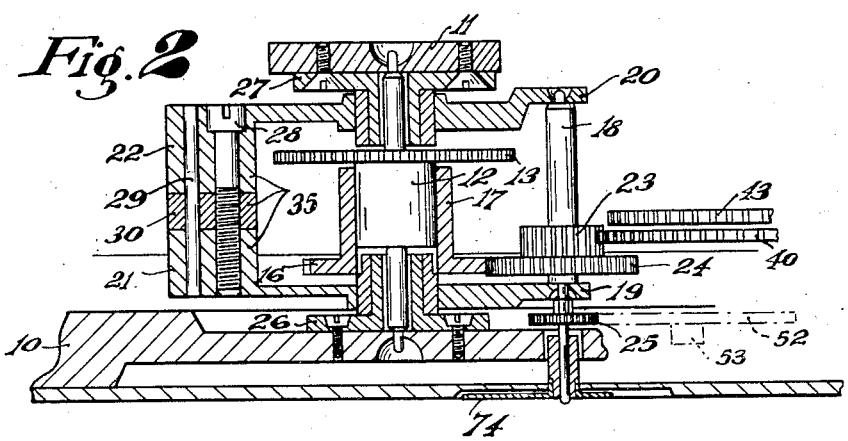
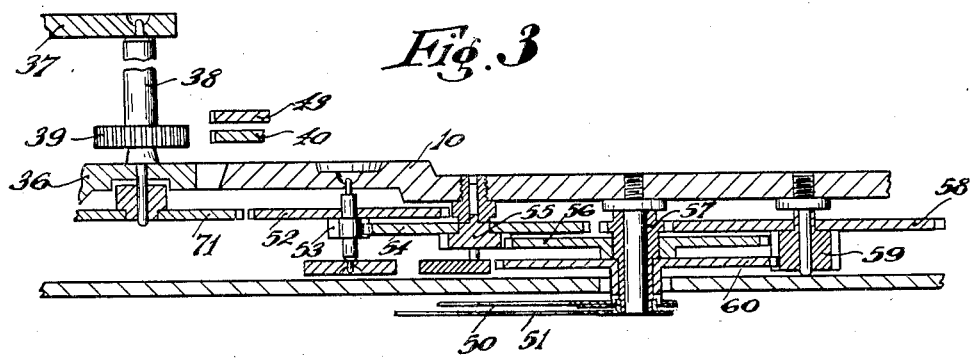
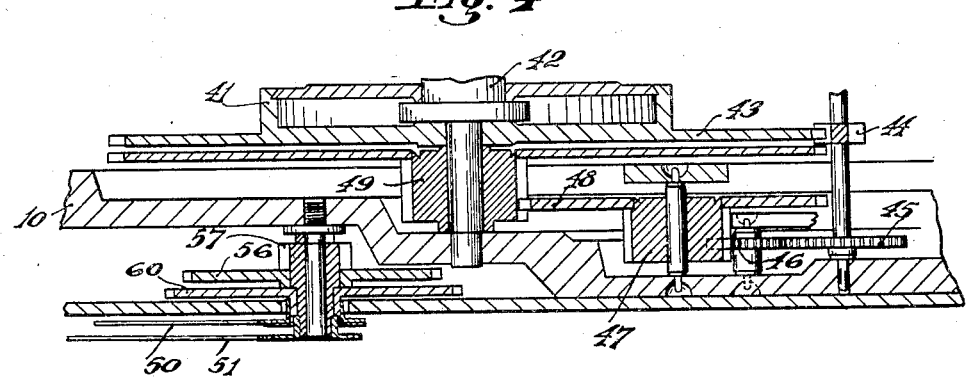

Sept. 29, 1936.  A. BUGNION ET AL  2,055,572
SETTING MECHANISM FOR TIMEPIECES
Filed Nov. 10, 1933  9 Sheets-Sheet 3
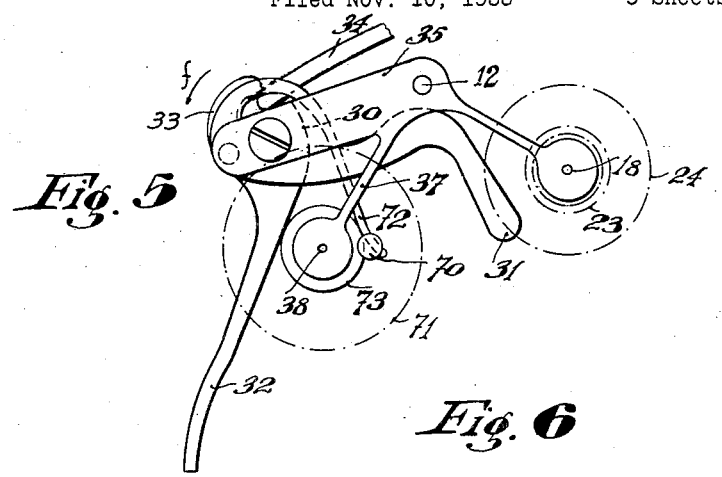
Fig. 5
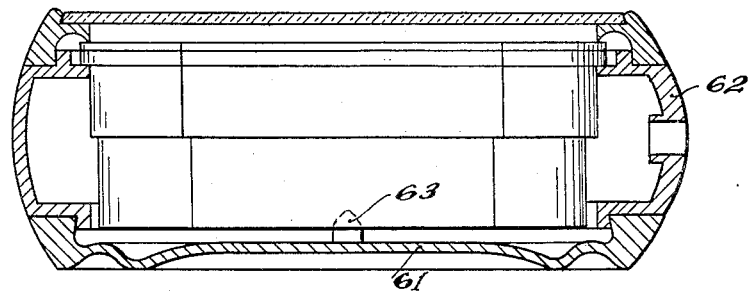
Fig. 6
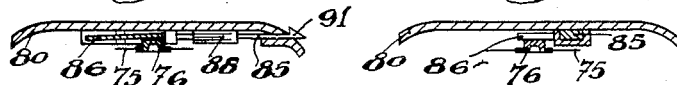
Fig. 10   Fig. 11
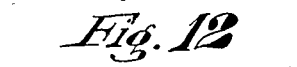
Fig. 9
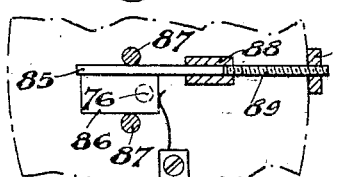
Fig. 13   Fig. 14
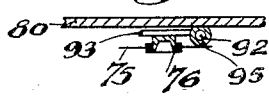
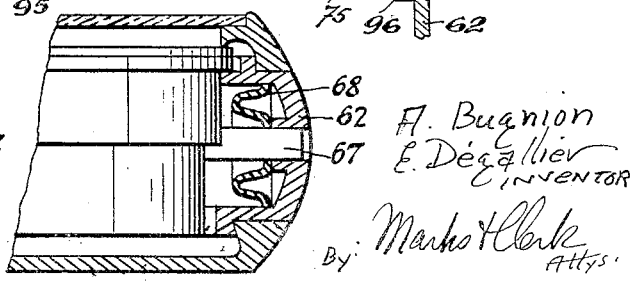
Fig. 6a
A. Bugnion
E. Dégallier
INVENTORS
By Marks & Clerk
Attys.

Sept. 29, 1936.  A. BUGNION ET AL  2,055,572
SETTING MECHANISM FOR TIMEPIECES
Filed Nov. 10, 1933  9 Sheets-Sheet 5

A. Bugnion
E. Pégaillier
INVENTORS

By: Marks & Clerk

Sept. 29, 1936.    A. BUGNION ET AL    2,055,572
SETTING MECHANISM FOR TIMEPIECES
Filed Nov. 10, 1933    9 Sheets-Sheet 7
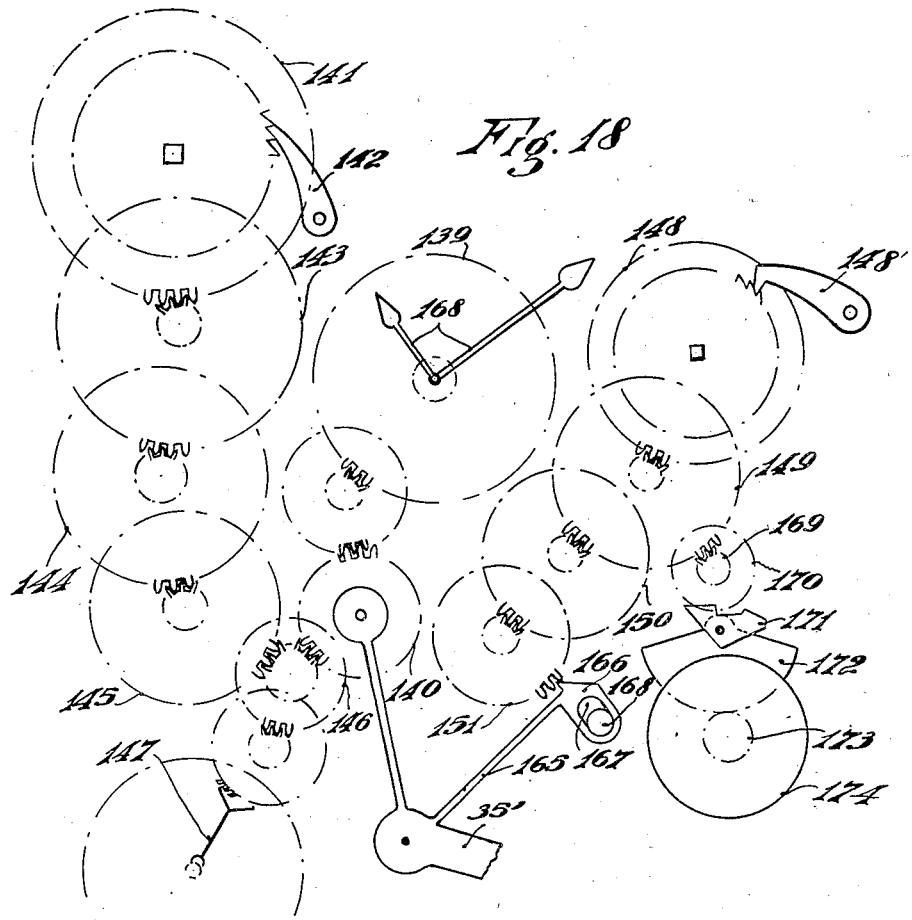
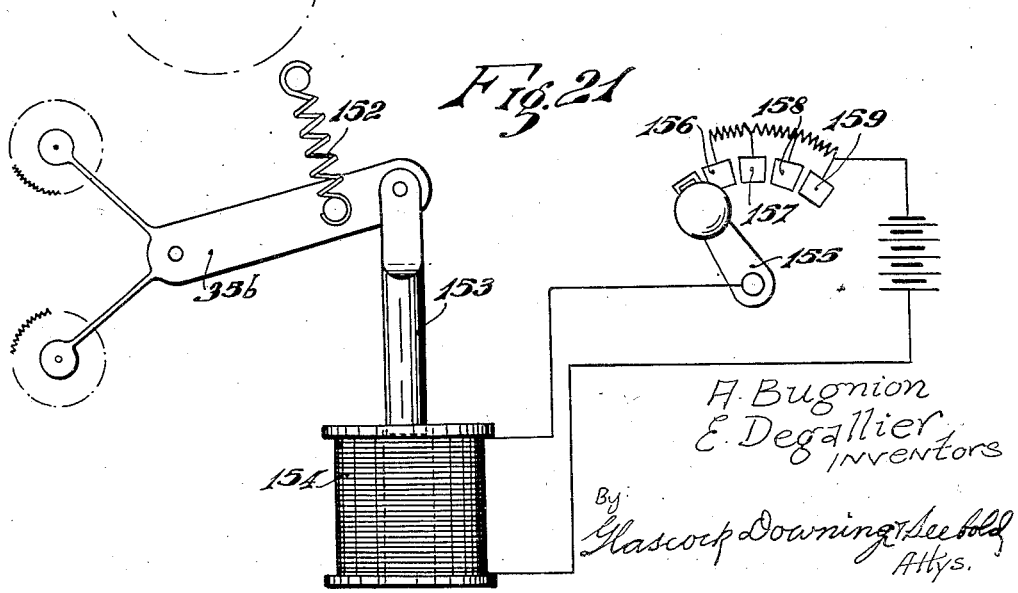
A. Bugnion
E. Degallier
Inventors
By Glascock Downing Seebold
Attys.

Sept. 29, 1936.  A. BUGNION ET AL  2,055,572
SETTING MECHANISM FOR TIMEPIECES
Filed Nov. 10, 1933  9 Sheets-Sheet 8

A. Bugnion
E. Degallier
Inventors
By Glascock Downing
& Seebold
Att'ys.

Sept. 29, 1936.   A. BUGNION ET AL   2,055,572
SETTING MECHANISM FOR TIMEPIECES
Filed Nov. 10, 1933   9 Sheets-Sheet 9

Patented Sept. 29, 1936

2,055,572

UNITED STATES PATENT OFFICE 2,055,572

SETTING MECHANISM FOR TIMEPIECES

Alexandre Bugnion, Geneva, and Edmond Dégallier, Lausanne, Switzerland

Application November 10, 1933, Serial No. 697,520
In Switzerland November 15, 1932

12 Claims. (Cl. 58—80)

This invention relates to time setting mechanism for timepieces and has as its principal object the provision of such mechanism wherein the time indicating members, which are usually connected to a time regulating member, may be disengaged from the regulating member and connected to other members subjected to motive power whereby the indicating members which are not retained by the regulating member may move at a greater speed for time setting purposes.

With the above and other objects in view, the invention consists in the features of construction and operation as fully set forth in the following specification and illustrated in the accompanying drawings. In such drawings forming a part of this specification, we have shown our invention embodied in a wrist watch, but it will be understood that the invention can be embodied also in any other type of watch or clock.

In the drawings,

Figure 2 is a section along the line 2—2 of Fig. 1 with the bearing for the arbor 12 shown enlarged.

Figure 3 is a section along the line 3—3 of Fig. 1, with certain parts omitted.

Figure 4 is a section along the line 4—4 of Fig. 1, with certain parts omitted.

Figure 5 is a plan view of a detail of the device.

Figure 6 is a transverse section of the wrist watch to which the invention is applied.

Figure 6a is a fragmentary transverse section of a watch showing modified operating means for the setting device.

Figure 9 is a plan view of a modified detail part.

Figures 10 and 11 are vertical sections of the same detail taken at right angles to each other.

Figure 12 is a plan view of a further modification of a part of the operating means.

Figure 13 is a section through this modification.

Figure 14 is a still further modification of the operating means.

Figures 18, 19, 20 and 21 are each a diagrammatic plan view of further modifications of a time setting device according to the invention.

Figure 1:
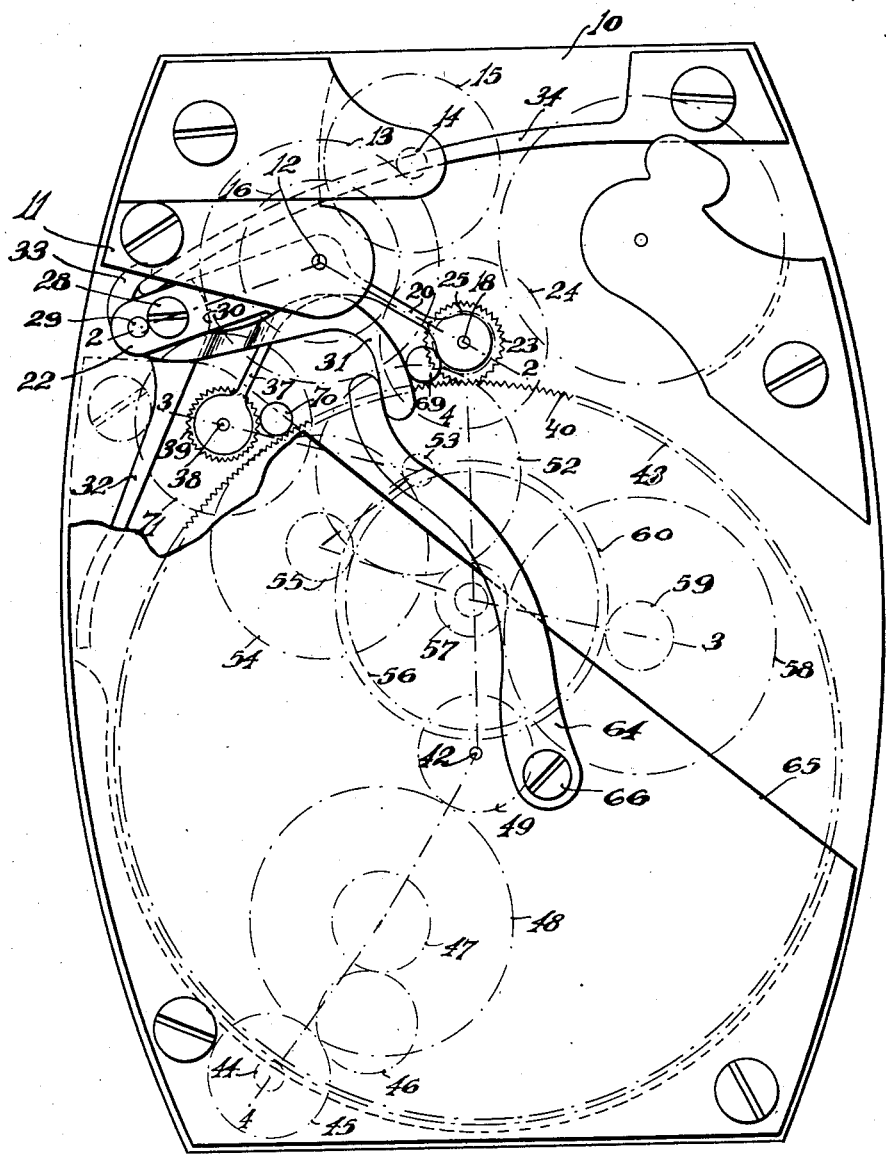
Figure 1 is a semi-diagrammatic plan view of a time setting device according to the invention and applied to a wrist watch.

Referring more particularly to Figs. 1 to 4, the represented watch movement comprises a movement plate 10 and a bridge 11 between which is mounted an arbor 12 carrying a wheel 13 meshing with the pinion 14 of the escapement wheel 15. The arbor 12 carries also a wheel 16 mounted on the arbor through the intermediary of a sleeve 17. An arbor 18 is mounted between two resilient arms 19 and 20 provided on two pieces 21 and 22, respectively. The arbor 18 carries a wheel 23 having a relatively small diameter, a wheel 24, and a small wheel 25. The pieces 21 and 22 are rotatably mounted on sleeves 26 and 27, respectively, surrounding the arbor 12 with some play and screwed to the movement plate 10 and to the bridge 11, respectively. The two pieces 21 and 22 are screwed together by a screw 28 after having been exactly positioned by means of a pin 29. A member 30 is interposed between the two pieces 21 and 22 and is provided with three arms 31, 32 and 33. A spring 34 acts on the arm 33 and consequently on the rigid rocking member constituted by the members 21, 22, 30 and the arbor 18, and designated as a whole by the numeral 35 in Fig. 2. The pieces 21 and 22 are provided with two further resilient arms 36 and 37 between which is mounted an arbor 38 carrying a pinion 39.

The wheels 23 and 39 are provided with fine teeth of triangular shape and capable of meshing with a wheel 40 having a large diameter and provided with similar teeth of the same pitch as those of the wheels 23 and 39. The spring 34 is capable of making the arms 19 and 20 yield for a purpose which will be described later, and this spring must also act with a force such that the radial component of the reaction in the contacting points of the wheels 23 and 39 with the wheel 40 be at least equal to the component of the driving force extending at right angles to the flank of the teeth in mesh with each other to maintain the arbor 18 in driving engagement with the wheel 40. The arbor 18 may carry a seconds hand 74.

Figures 1 and 4 illustrate how the driving force is transmitted to the wheel 40 from a spring barrel 41 having a shaft 42. The barrel comprises a disk 43 of considerably larger diameter than that of the spring containing drum and being exactly superposed to the wheel 40. The spring of the barrel may be tensioned by an ordinary hand winding device or by any known self-winding mechanism. The teeth of the barrel disk 43 transmit driving power to the wheel 40 by means of the wheel train 44, 45, 46, 47, 48 and 49, the pinion 49 being loose on the barrel shaft 42 and being fixed to the wheel 40. In the represented position the pinion 23 meshes with the wheel 40, so that the escapement is actuated by the wheels 24, 16 and 13, while the pinion 39 is out of mesh with the wheel. 40 Simultaneously the wheel 25 transmits the movement to the hands 50 and 51 by the intermediary of a wheel train comprising the wheels 52, 53, 54, 55, 56, 57, 58, 59 and 60 (Fig. 3).

Figure 6 shows a watch case in section. The back 61 of the case, which can be distinct of the center ring 62 or welded to this center ring, is so designed that it may resiliently yield through some tenths of a millimeter, to form an operating member carrying a cone-shaped member 63 in its center arranged to act on a lever 64 visible in Fig. 1, and mounted on the barrel bridge 65 by means of a pivot screw 66. Figure 6a shows an alternative operating member constituted by a push rod 67 to which is secured a deformable diaphragm 68 welded to the push rod and with its entire exterior periphery to the center ring 62 of the case. This modified operating means is applied with particularly thick watch cases or with clock cases. The push rod 67 acts on the swinging member 35 by the intermediary of the arm 32, while the lever 64 acts on the arm 31.

Figure 15:
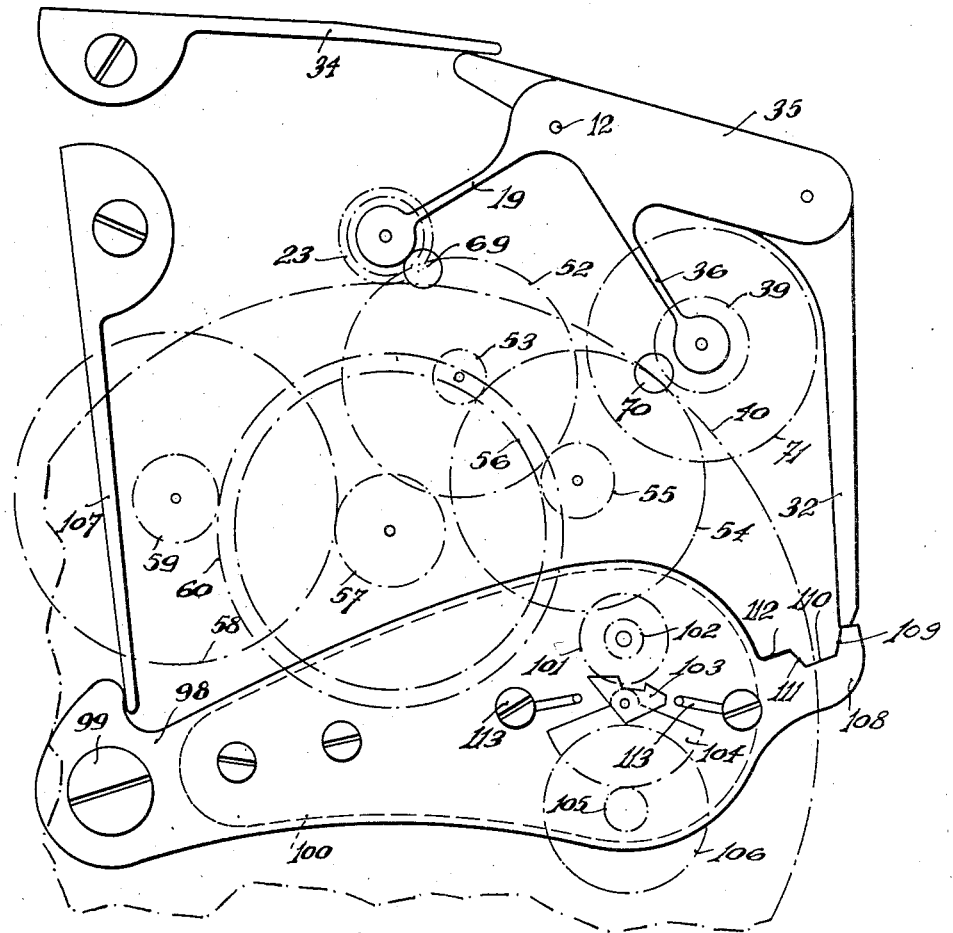
Figure 15 is a diagrammatic plan view of a mechanism situated beneath the dial of the watch and destined to slow down the speed of the time indicating member during the setting operation.
Figure 17:
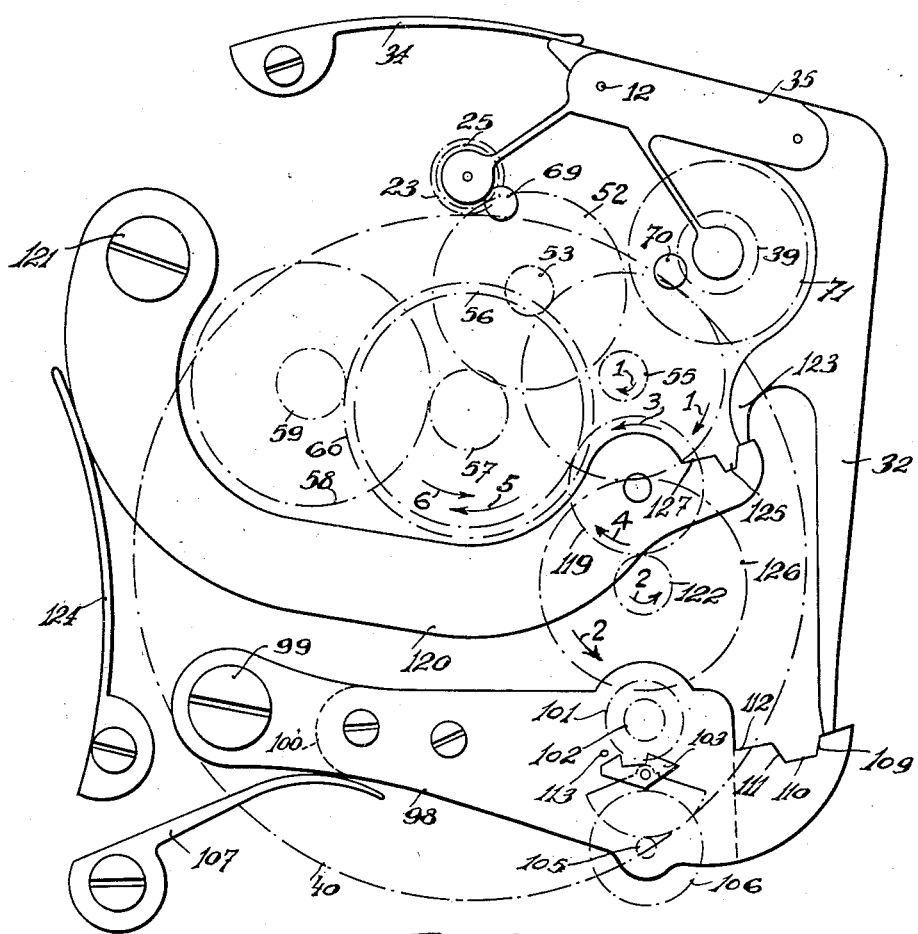
Figure 17 is a plan view of a mechanism similar to that shown in Fig. 15 but permitting the indicating members to rotate in a reverse direction at reduced speed.

The operation of the described device is the following:

When the yieldable back 61 of the watch case is in its normal position of rest, the end of the lever 64 is urged towards the left in Fig. 1 by the arm 31 subjected to the action of the spring 34 tending to turn the rocking member 35 in clockwise direction and holding this member at one end of its stroke, the arm 20 bearing against a stop pin 69 and the arm 19 bearing against a similar stop on the opposite side of the movement and which is visible in Figs. 15 and 17 showing modified watch movements as seen from the opposite side. These stops are placed so that when the rocking member 35 bears against them the wheels 23 and 40 are in correct mesh. Owing to the fact the rocking member 35 is stopped by the ends of the two arms 19 and 20, these arms yield for a small amount which cannot be represented in the drawings. The members 21 and 22 are so disposed that when the lever 64 is not acted upon by the operating cone 63, the arms 36 and 37 are free and distant from a stop pin 70, and the pinion 39 is not in mesh with the wheel 40, as also the wheel 71 on the shaft 38 and the wheel 52 are out of mesh.

The watch movement will be adjusted so that the arbor 18 and the wheel 25 make one revolution per minute while the wheel 52 meshing with the wheel 25 transmits the movement by the described train to the hands 50, 51.

In order to separate the driving train from the escapement while having it remain in driving engagement with the minute train, a pressure is exerted on the yieldable back 61 of the watch case, which pressure is transmitted by the cone 63 to the lever 64 in turn acting on the rocking member 35. The primary effect of this action is to detension the arms 19, 20, but without bringing the wheels 23 and 40 out of mesh with each other. This release of the arms 19, 20 corresponds however to a slight rotation of the swinging member 35 through a sufficient angle to bring the wheel 39 in mesh with the wheel 40 and the wheel 71 in mesh with the wheel 52. As soon as these wheels mesh the escapement stops owing to the fact that the wheel 52 cannot turn when meshing simultaneously with the wheels 71 and 25. The time indicating members being stopped, a setting operation can now be effected in the case when the watch has only a few seconds advance over a master clock according to which the watch is to be set, by simply letting the watch stop until the master clock indicates the same number of seconds as the stopped watch, in which moment the back 61 of the watch is released, permitting thus the watch movement to start again. In the great majority of cases however the minute hand must be moved to set a watch. When such a setting operation is to be effected, the back 61 of the watch case will be pressed further inwards, so that the lever 64 turns the rocking member 35 through a sufficient angle to bring the wheels 23 and 40 out of mesh and also disengage the wheel 25 from the wheel 52. The arms 36 and 37 abut against the stop 70 and will yield while the wheels 39 and 71 mesh with the wheels 40 and 52, respectively.

The transmission train from the spring barrel to the hands 50, 51 through the intermediary of the wheel 39 comes now into action. Since the escapement has been disengaged, the speed of this train will be accelerated and this acceleration depends on the inertia of the wheels and on the friction.

In the represented example showing a small watch, the inertia of the wheels is evidently insufficient to have the minute-hand move slow enough, that is with an average speed of about one revolution per minute, in order to set the watch with a precision of about one fifth of a minute. In order to permit a slow movement of the hands, a spring brake member 72 may be provided as shown in Fig. 5. This member is arranged so that the braking action is a maximum at the moment of release of the time setting train and decreases when the movement of the swinging member 35 continues in the direction in which the arms 36, 37 are applied against the stop 70, which happens when the watch must be set for an amount of an hour or more and a relatively quick movement of the hands is required. For this purpose the spring brake 72 exerts an initial tension against a disk 73 fixed on the shaft 38. Since the spring is integral with the piece 30 of the rocking member 35, the action of the spring on the disk 73 decreases when the rocking member is turned in the direction of the arrow f in Fig. 5 and the arm 37, applied against the stop 70, yields to let the rigid parts of the rocking member turn slightly further.

In this manner the driving force exerted from the barrel spring on the minute train can vary from zero to a maximum value. The spring brake 72 acts radially on the disk 73. Without departing from the scope of the invention any other braking device may be employed of which the braking action depends on the position of the rocking member 35.

The hands of the watch will turn as long as a sufficient pressure is exerted on the back 61 of the watch case. When this pressure decreases, the rocking member 35 turns in clockwise direction, the arms 36, 37 being detensioned and the arms 19, 20 approaching the wheels 40 and 52. During this time, when a braking spring as in Fig. 5 is used, the speed of the hands decreases under the increased action of the spring brake 72 and by suddenly releasing the back 61 at the desired moment, the watch can be set with precision.

It is also possible to decrease the pressure on the back 61 to that degree only which is necessary to have both wheels 71 and 25 meshing with the wheel 52 to stop the minute train slightly in advance of the correct time and then wait until the position of the seconds hand corresponds exactly to that of the master clock before fully releasing the back 61. In this case the minute-hand must be stopped at a position corresponding to the fraction of one minute indicated by the seconds hand.

It is seen that the action of the push rod 67 on the lever 32 integral with the member 30 of the rocking member 35 will have the same effect as the action of the lever 64 on the lever 31.

In Figure 18, a driving motor for effecting the setting is independent of the ordinary driving motor of the clockwork. A supplemental spring moves the minute train for setting purposes without stopping the principal clockwork train. This can be obtained by arranging the cannon pinion and the hour wheel as shown in Fig. 4, that is to say by mounting the cannon pinion not on a wheel of the principal train, but by connecting this pinion to the principal train by means of an intermediate gear carried by a clutch mechanism which can exchange the connection of the cannon pinion with the principal train for the connection with the supplemental spring motor.

Fig. 18 shows an arrangement which may be used in connection with a clock movement. The principal train includes a spring barrel 141 with a mainspring holding pawl 142, the barrel driving a train of wheels 143, 144, 145 and 146 which latter wheel is ordinarily connected to a wheel 140 carried by a clutch or rocking member 35' similar to the member 35 described with reference to Figs. 1 and 2. The wheel 146 is also connected to an escapement device 147. The supplemental spring motor comprises a barrel 148 with a spring holding pawl 148', this barrel being connected to a train of wheels 149, 150, 151, the latter wheel having teeth of the same pitch as those of the wheel 140, so that upon a rocking movement of the clutch member 35' the wheel 140 can mesh with the wheel 151 to connect the barrel 148 to the cannon pinion wheel 139 for time setting purposes. The clutch member 35' carries an arm 165 provided with a pawl 166 which holds the wheel 151 against being moved by the barrel 148; the wheels 149 and 150 are thus also locked. When the clutch member 35' is rocked to bring the wheel 140 into mesh with the wheel 151, the pawl 166 is disengaged from the wheel 151. The body of the pawl 166 is provided with a slot 167 engaging with a fixed pin 168. In this manner the arm 165 cannot transmit the force of the spring barrel 148 to the clutch member 35' and cause any undesired rocking movement of this member. Any other means for holding the wheel train connected to the barrel 148 against movement when not used for effecting a setting operation may be employed, the pawl structure shown in the drawings forming no part of our present invention. In order to prevent the hands 168 from turning too fast when the clutch device 35' is shifted to set the hands, a speed regulating member is combined with one of the wheels of the setting train. The wheel 149 meshes with a pinion 169 of an escapement wheel 170 which coacts with a recoil anchor 171 secured to a toothed sector 172 meshing with a pinion 173 of a flywheel 174.

By means of an analogous mechanism it is possible to utilize that end of the main spring for setting purposes, which is not connected to the train ending at the movement regulating member. Instead of utilizing the power of the main spring for effecting setting of the watch by disengaging a portion of the principal train as is the case in the described example, the setting movement of the hands could be effected by simply disengaging the ordinary minute train from the principal train and engaging this minute train with a wheel in driving connection with that end of the main spring which is not connected to the movement train.

Figure 19:
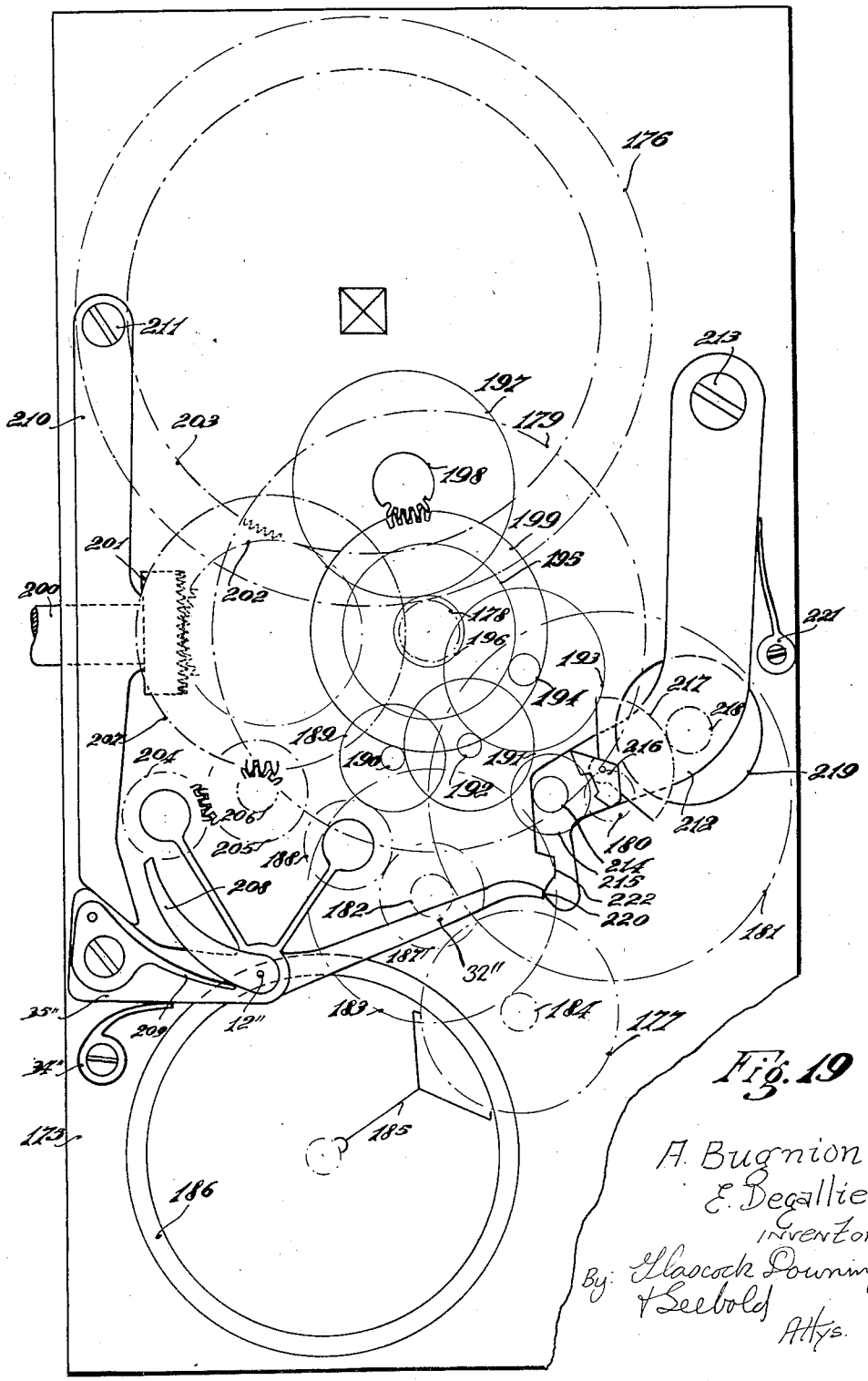

Such a construction is represented in Fig. 19 showing a watch movement mounted on a movement plate 175. The mainspring barrel 176 is connected to an escapement wheel 177 by the intermediary of a wheel train composed of a pinion 178, the center wheel 179, pinion 180, wheel 181, pinion 182, wheel 183 and pinion 184. The escapement wheel 177 coacts with an anchor 185 and a balance wheel 186. The pinion 182 is connected to the hands of the watch by a wheel train composed of wheels 187, 188, 189, pinion 190, wheel 191, pinion 192, wheel 193, pinion 194, cannon pinion wheel 195 and cannon pinion 196. This latter is connected by a wheel 197 and pinion 198 to the hour wheel 199. Winding of the watch is effected as usually by means of the stem 200 carrying a winding pinion 201 meshing with a wheel 202 engaging with the ratchet 203 of the spring barrel.

The wheel 188 is carried by a clutch member 35'' which can rock about an arbor 12''. This clutch member carries a second wheel 204 which is normally in mesh with a wheel 205 rigid with a pinion 206 meshing with a wheel 207 fast on the wheel 202. In order to hold the main spring against unwinding, a pawl 208 coacts with the wheel 204 carried by the clutch member 35'' and is maintained in engagement with this wheel by a spring 209 carried by the clutch member. An arm 210, rotatably mounted on a screw pin 211, bears on the winding pinion 201 and has its free end abutting against the the rocking member 35''. When the stem 200 is pulled outwardly, the arm 210 swings also outwardly and rocks the clutch member 35'' about the arbor 12''. The wheel 188 carried by the clutch member disengages from the wheel 187 and engages with the wheel 205 while remaining in mesh with the wheel 189. Simultaneously the wheel 204 carried by the rocking member is disengaged from the wheel 205 and therefore the winding ratchet 203 of the spring barrel is not held any more by the pawl 208 against being unwound. The winding ratchet drives the wheel 188 by the intermediary of the wheels 202, 207, 206 and 205, while the movement of the wheel 188 is transmitted, as just described, to the hands of the watch to effect a setting movement thereof. The provision of the pawl 208, the wheel 207 and the arm 210 forms no part of our present invention.

In order to prevent the hands of the watch from racing too fast when they are connected to the spring barrel ratchet and accordingly disconnected from the ordinary regulating device, a supplementary regulating or braking device is provided, which is put into action when the clutch member 35'' is shifted to effect a setting operation. This regulating device is mounted on an arm 212 rotatable on a screw pin 213, and comprises a pinion 214 carrying an escapement wheel 215 with which coacts a recoil anchor 216. This anchor is secured to a toothed sector 217 meshing with a pinion 218 rigidly connected to a flywheel 219. An arm 32'' of the clutch member 35'' has its end abutting against an edge 220 of the arm 212. When the clutch member is moved to setting position, the arm 32'' falls off from this edge 220, and the arm 212 is moved by the action of a spring 221, such movement being permitted by the end of the arm 32'' engaging into a notch 222 on the arm 212. This movement of the arm 212 has brought the pinion 214 into mesh with the wheel 191 of the time train. When the setting operation is finished, the stem 200 is pushed back and a spring 34'' moves the clutch member 35'' back into its previous position shown in Fig. 19.

A part of the setting train is preferably mounted to be independent of a part of the principal train described with reference to Figs. 1 to 4, as has been shown in the example, so that the multiplicating ratio of the wheel train between the spring barrel and the hands will be greater while the hands are set than during normal running of the watch. In the described example the diameter of the wheel 71 is three times longer than that of the wheel 25 connecting the barrel to the escapement. In this manner the barrel can turn the hands for an amount corresponding to twelve hours in a setting operation, while the main spring has been deenergized only for an amount corresponding to four hours normal running of the clockwork.

The described mechanism has the advantage of simplifying the time setting operation in a watch, since a simple pressure is sufficient to release the relatively rapid movement of the hands which move quite by themselves into the desired position. Particularly in wrist watches where the setting operation by means of the usual setting stem is often difficult to effect, the described mechanism will be appreciated. The use of the yielding back 61 of the watch avoids the necessity of having a hole in the watch case for the setting stem which hole enables moisture and dust to penetrate into the movement.

The invention is however not limited to self-winding watches only, and can be employed also advantageously in watches having an ordinary winding stem, the described time setting mechanism could then be put in action by the ordinary operating member which is usually used to effect setting, as the winding stem, or any other sliding or rotating member.

Figure 20:
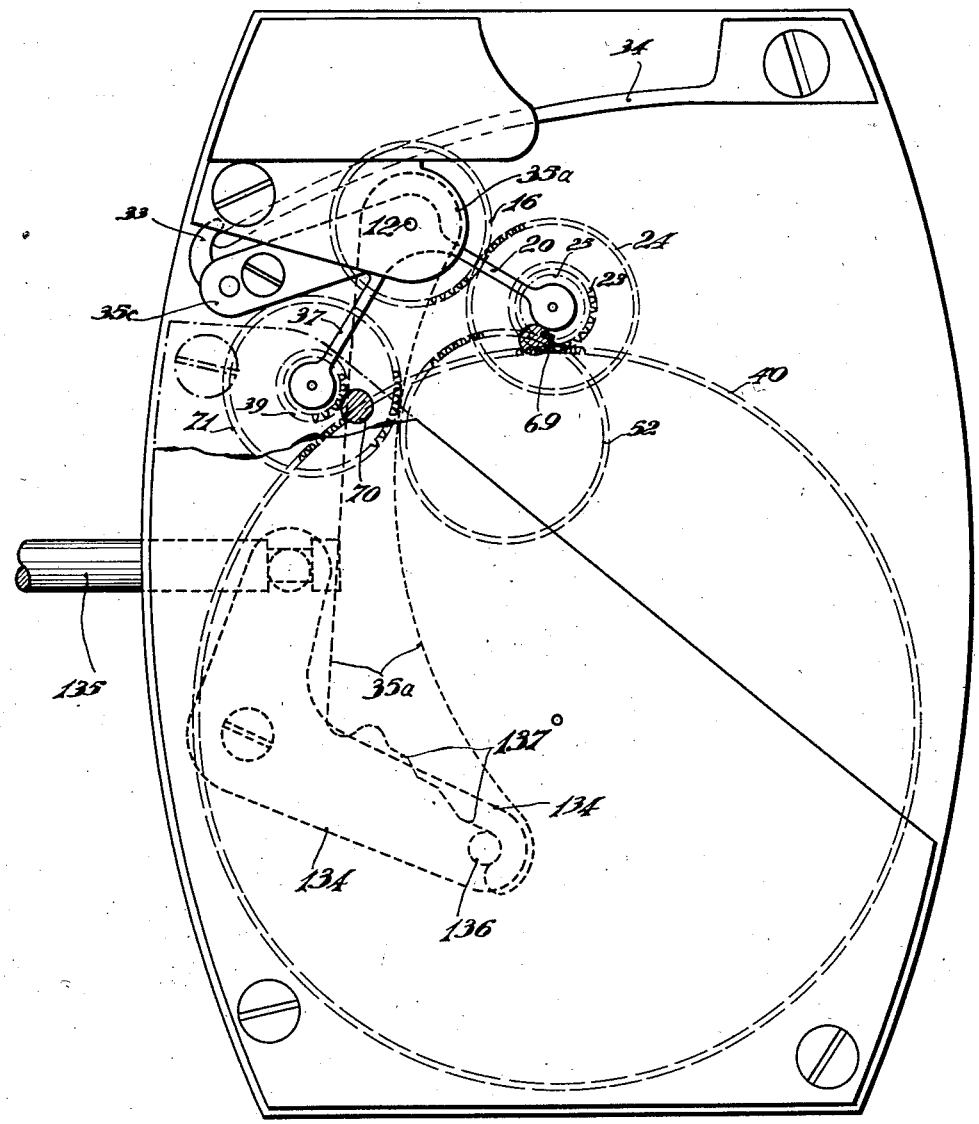

Such an arrangement is shown in Fig. 20 representing a watch movement similar to that shown in Fig. 1. The clutch member 35c is again provided with two arms 20 and 37, the arm 20 carrying a wheel 23 and the arm 37 carrying a wheel 39. According to the position of the clutch member 35c one or the other of the two wheels 23 or 39 can mesh with a driving wheel 40 connected to the main spring barrel, not shown. The position of the clutch member 35c is controlled by the winding and setting stem 135 which engages one arm of a setting lever 134, the other arm of which carries a pin 136 engaging with a notched edge 137 of an arm 35a rigidly connected to the clutch member 35c capable of rocking about the arbor 12. The lever 134 and arm 35a form however no part of our present invention, and other means could be used for connecting the winding and setting stem to the clutch member 35c.

In the position shown in Fig. 20 the wheel 23 meshes with the driving wheel 40 and the wheel 25 rigid with the wheel 23, meshes with the wheel 52 which, as in the arrangement shown in Fig. 1, transmits the driving movement to a wheel train connected to the hands of the watch. The wheel 24 rigid with the wheel 23, meshes with the wheel 16 connected, as in Fig. 1, to an escapement wheel, not shown. When the winding stem 135 is pulled outwardly the pin 136 of the lever 134 moves the arm 35a which causes a rocking movement of the clutch member 35c about the arbor 12. The wheel 23 disengages from the wheel 40 and the wheel 39 meshes with this wheel.

The wheel 71 rigid with the wheel 39 meshes then with the wheel 52, while the wheel 25 is out of mesh with the wheel 52, and setting of the hands can be effected as had been described with reference to Fig. 1. Owing to the action of the spring 34 on an arm 33 of the clutch member 35c, the pin 136 is yieldingly maintained in the notch of the edge 137 of the arm 35a into which it had been brought by the actuation of the winding and setting stem 135.

In tower clocks the described setting mechanism can be associated with electromagnetic operating devices permitting setting by remote control and avoiding climbing the towers every time the clock is to be set.

Figure 21 shows an electromagnetic control device for the rocking member 35b. An electromagnet 154 cooperates with a core 153 pivoted on the rocking member 35b urged in counterclockwise direction by a spring 152. The force of traction exerted by the core 153 on the rocking member may be controlled by a regulating resistance having an operating member 155 and four contact blocks 156, 157, 158 and 159. When contact is established between the operating member and the first block the hands of the clock are stopped; contact with the second block corresponds to reverse movement of the hands, contact with the third block corresponds to small forward movement and contact with the fourth block to fast forward movement of the hands, the rocking member 35b coacting with a change speed device similar to that shown in Fig. 17. The regulating resistance with the operating member 155 will be situated at a place in easy reach of the person having care of the tower clock, while the electromagnet and the rocking member 35b will be placed in the clockwork.

Figures 7, 8:
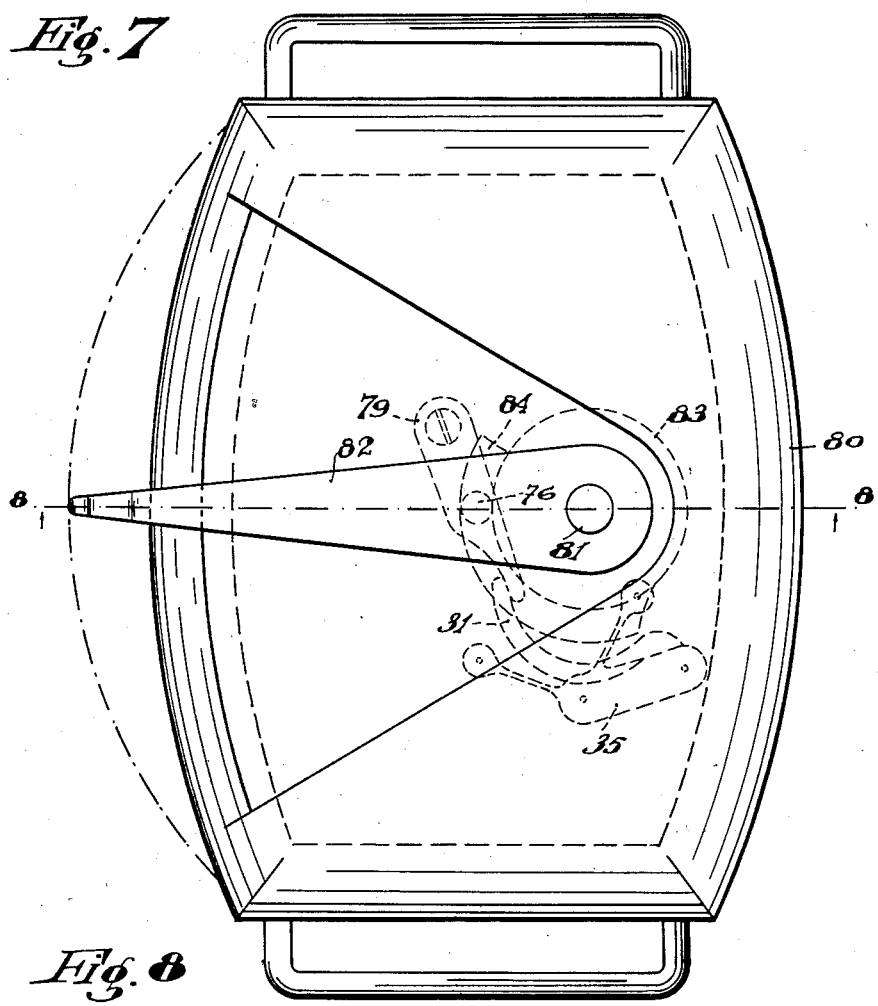
Figure 7 is a plan view of a wrist watch seen from the back and provided with modified operating means for the time setting device.
Figure 8 is a fragment of a section along the line 8—8 of Fig. 7.

Figs. 7 and 8 show a modification of the operating means for the setting mechanism. A resilient lid or diaphragm 75 is welded all around the periphery of the center ring 62 to form a tightly fitting interior back. This lid carries a button 76 riveted or welded thereto. This button is provided with a conical recess 77 in which is partly engaged a cone 78 carried by a lever 79 mounted on the bridge 65 of the movement. A rigid back 80 covers the lid 75 and carries an operating device comprising a pin 81 rotatably carried by the back 80 and to which is secured a lever 82 externally of the back, while in the interior the pin 81 carries a disk 83 provided with a helicoidal cam surface 84. This cam is arranged to act on the button 76 of the diaphragm 75. When the button 76 is pushed downwardly by the cam, its recess acts on the cone 78 to slightly turn the lever 79 which acts against the arm 31 of the rocking member 35 and the time setting train will then be put in action as previously described.

Figures 9 to 14 represent other modifications of operating means. In Figs. 9 to 11 the operating button 76 is moved by means of a sliding rod 85 provided with a cam surface 86 and guided between pins 87 and in a collar 88 secured to the back 80 of the watch case. The rod 85 projects out of the watch case so that it can be manually operated. In Fig. 9 the rod 85 has a threaded portion 89 screwing into a nut 90 rotatably fixed to the wall of the watch case, so that rotation of the nut will result in a longitudinal movement of the rod and the cam 86 acts on the button 76 carried by the resilient diaphragm 75. In Fig. 10 the rod 85 is provided with a head 91 permitting the rod to be pulled.

According to Figs. 12 and 13, the operating member is constituted by a rotatable operating rod 92 carrying a pallet 93 for bearing on the button 76, and an operating button 94. The rod 92 turns in bearings 95 fixed to the back 80 of the watch case.

In Fig. 14 it is shown that the diaphragm 75 can be fixed to a projection 96 of the center ring 62, while the back 80 of the case is entirely flat. In this case the operating rod 97 projects through the center ring and not through the back.

Figure 16:
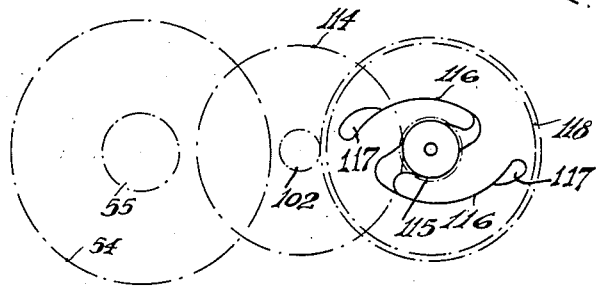
Figure 16 shows a modification of a part of this invention.

Figures 15 and 16 illustrate a modified mechanism which permits the hands to move slowly without requiring a braking spring as shown in Fig. 5. This mechanism comprises a rocking lever 98 mounted on the pivot 99 and carrying regulating members between a face thereof and a bridge 100 screwed to the rocking lever. The regulating members comprise an escapement wheel 101 with its pinion 102, and a recoil anchor 103 fast on a toothed sector 104 meshing with a pinion 105 of a flywheel 106. The rocking lever 98 is subjected to the action of a spring 107. An extension 108 of the lever 98 bears against an arm 32 of the rocking member 35 analogous to that described with reference to Fig. 1 and connected to any of the described operating means. The extension 108 of the lever 98 is provided with a cam surface comprising surface portions 109, 110, 111 and 112. The portions 110 and 112 are substantially cylindrical and have as center the center of rotation 12 of the rocking member 35.

The operation of this device is as follows: When the rocking member 35 turns in clockwise direction, the yieldable arm 19, which has been under tension because applied against the stop 69 by the action of the spring 34, is detensioned. Simultaneously the pinion 39 is brought to mesh with the wheel 40, and the wheel 71 with the wheel 52, while the end of the arm 32 falls off from the extension 108 and comes to bear on the surface 110 of this exension, the spring 107 turning the lever 98. This movement of the lever has brought the pinion 102 in mesh with the wheel 54. As explained with reference to Fig. 1, all the wheels stop in this moment since the wheel 52 meshes with both wheels 71 and 23.

When the movement of the rocking member 35 continues, the arm 36 is applied against the stop 70 and yields, while the pinion 23 disengages from the wheel 40. The wheels of the minute train are now released but connected to the pinion 102. The wheel 101 acts on the anchor 103 and makes it oscillate as also the flywheel 106. Resilient stop members 113 are adjustably mounted on the lever 98 to permit the variation of frequency of the anchor oscillations.

The described mechanism is adjusted in such a manner that the minute-hand, when the parts are in the position referred to above in which the end of the arm 32 bears against the surface 110, makes about one revolution per minute so as to be distinctly perceptible and so that the maximum error over correct time when releasing the operating member, due to the period of physiological reaction of about one fifth of a second, be not more than one fifth of a minute. When the hands of the watch have to be advanced for a small amount only, the operating member of the setting mechanism will be left in the position corresponding to such slowed down speed of the hands. If however the hands are to be turned through an angle corresponding to several hours, the rocking member 35 is made to turn further in clockwise direction, so that the arm 32 acting against the surface 111 of the lever 98, turns this lever slightly to bring the pinion 102 out of mesh with the wheel 54. The speed regulating device being now cut out, the minute-hand of the watch turns very rapidly and in order to stop this rapid movement at approximately the desired moment, the hour-hand is watched. When this moment arrives, the rocking member 35 is slightly released so that the spring 34 brings it back into the position where the arm 32 bears against the surface 110 and the pinion 102 connects the regulating device to the train and correct adjustment of the hands is obtained by having them move with their slow speed into the desired position whereafter the rocking member 35 is completely released. This has the effect that the arm 32 acting against the surface 109, pushes the lever 98 back into its initial position shown in Fig. 15.

When it is desired to make the position of the seconds hand exactly correspond with that of the seconds hand of a master clock, the minute-hand is stopped slightly in advance over correct time, and the operating member for the rocking member 35 is not fully released but maintained in the position in which the rocking member is so disposed that both pinions 23 and 39 mesh with the wheel 40 to prevent any movement of the minute train until the position of the seconds hand corresponds to that of the seconds hand of the master clock.

In the modification represented in Figure 16 a centrifugal force governor is used as speed regulating member for the minute train during setting operation. This governor comprises a train of two wheels mounted on the rocking lever 98, one of the wheels being the pinion 102 which can be brought to mesh with the wheel 54 of the minute train. A wheel 114 is mounted for rotation with the pinion 102 and meshes with a pinion 115. Two flexible arms 116 are mounted for rotation with the pinion 115 and carry weights 117 which upon rotation of the pinion expand and slide along the wall of a fixed brake drum 118.

The pinion 55 and the wheel 56 corresponding to the equally numbered parts in Figs. 1 and 15 are however not meshing directly with each other. The wheel 56 meshes with an intermediate wheel 119 having teeth of the same pitch as those of the wheel 55 and mounted on a lever 120 turning on the axis 121. The wheel 119 meshes continuously with the wheel 56 and normally with the pinion 122 rotatably mounted on the not represented movement plate. The wheel 126 constantly meshes with the wheel 54 supposed to rotate in the direction of the arrow 1 and imparting rotation to the wheel 126 in the direction of the arrow 2.

The arm 32 of the rocking member 35 is provided with a finger 123 controlling the position of the lever 120 subjected to the action of a spring 124 and provided with a notch 125. The wheel 126 turning with the pinion 122 can be brought into mesh with the pinion 102 of a regulating member similar to that described with reference to Fig. 15.

When the rocking member 35 is actuated for effecting a setting operation, the finger 123 moves towards the notch 125 and the spring 124 turns the lever 120 so that the notch 125 engages over the finger 123 and the wheel 119 carried by the lever meshes with the pinion 55, while simultaneously the pinion 102 meshes with the wheel 126 as the lever 32 permits the lever 98 to turn to have the surface 110 bearing against the end of the arm 32. The wheel 119 is actuated by the pinion 55 in the direction of the arrow 3 and imparts rotation to the wheel 56 in the direction of the arrow 5 which corresponds to counterclockwise rotation of the hands because the watch movement is seen from the back.

If however the hands have to be advanced instead of being turned backwards, the rocking member 35 is suddenly moved with a greater force so that the notch 125 has not the necessary time to fall over the finger 123, and the lever 120 will abut with the surface 127 against the finger 123, while the end of the lever 32 remains still in contact with the surface 110 of the lever 98 in which position the regulating member carried by this lever is still connected to the minute train, so that a slow speed in clockwise direction is now obtained for the hand, as the wheel 119 turns now in the direction of the arrow 4 and meshes with the pinion 122, driven by the intermediary of the wheels 54 and 126, and turns the wheel 56 carrying the minute hand, in the direction of the arrow 6. When a setting operation of an amount corresponding to several hours has to be made, the rocking member 35 is still turned further until the arm 32 cooperating with the surfaces 111 and 112, pushes the lever 98 further back to release the regulating member so that the hands will move at a rapid speed.

When the rocking member 35 is released, the same functions as above explained will be produced in reversed order, and when the hands have been stopped somewhat in advance of correct time, the rocking member can be set to obtain a rearward movement of the hands before it is completely released.

We claim:—

1. In setting mechanism for timepieces having time indicating members normally moved by a wheel train connected with a speed regulating member, a power driven driving member for said wheel train, a coupling device normally connecting the time indicating members to the speed regulating member and to said power driven member, and operating means for actuating said coupling device to temporarily disconnect the time indicating members from the speed regulating member and to establish connection between the time indicating members and said driving member.

2. In setting mechanism for timepieces having time indicating members moved by a wheel train normally connected to a speed regulating member, a driving member for said train, a coupling member capable of a to-and-fro movement, operating means for holding the coupling member in either of the two extreme positions of its to-and-fro movements, a plurality of wheels carried by the coupling member, two of said wheels establishing communication between the time indicating members and the speed regulating member upon the coupling member being in one of the extreme positions of its to-and-fro movement and disconnecting the time indicating members from the speed regulating member upon the coupling member being in the other of its extreme positions, and two other of said wheels establishing communication between the time indicating members and said driving member upon the coupling member being in said second mentioned extreme position.

3. In setting mechanism for timepieces having time indicating members moved by a wheel train normally connected to a speed regulating member, a driving member for said wheel train, a coupling member mounted for a to-and-fro movement, operating means for moving said coupling member into either of the two extreme positions of its to-and-fro movement, said coupling member having two yieldable arms, a pair of wheels carried by each arm, one of said wheel pairs connecting said driving member to the time indicating members and to the speed regulating member upon the coupling member being in one of the extreme positions of its to-and-fro movement, and the other wheel pair connecting said driving member to the time indicating members upon the coupling member being in the other of its extreme positions.

4. In setting mechanism for timepieces as defined in claim 3, the feature that said two pairs of wheels carried by the coupling member have different transmission ratios.

5. In setting mechanism for timepieces having time indicating members moved by a wheel train normally connected to a speed regulating member, a driving member for said wheel train, a coupling member mounted for effecting a to-and-fro movement, operating means for moving said coupling member into either of the two extreme positions of its to-and-fro movement and into an intermediate position, said coupling member having two yieldable arms, a pair of movement transmission wheels carried by each arm, the transmission ratios of the two wheel pairs being different, one of said wheel pairs connecting said driving member to the time indicating members and to the speed regulating member upon the coupling member being in one of its extreme positions, and the other wheel pair connecting the driving member to the time indicating members upon the coupling member being in the other of its extreme positions in which the first mentioned wheel pair is disconnected from the driving member, and both said wheel pairs being connected to the driving member upon the coupling member being in intermediate position to thereby stop said wheel train.

6. In setting mechanism for timepieces having time indicating members moved by a time train normally connected to a time speed regulating member, a power driven driving member for said time indicating members, a coupling member movable for temporarily disconnecting the time train speed regulating member from the time indicating members whereby to permit said driving member to move the time indicating members independently of the time train speed regulating member, a setting speed regulating member, and means operable upon disconnection of the time train speed regulating member and cooperating with said coupling member for operatively connecting said setting speed regulating member to the time indicating members.

7. In setting mechanism for timepieces having time indicating members moved by a time train normally connected to a time train speed regulating member, a power driven driving member for said time indicating members, a coupling member movable for disconnecting the time train speed regulating member from the time indicating members whereby to permit said driving member to move the time indicating members independently of the time train speed regulating member, a setting speed regulating member, a movable support for said setting speed regulating member, and means operable upon disconnection of the time train speed regulating member and cooperating with said coupling member for moving said support and operatively connecting said setting speed regulating member to the time indicating members.

8. In setting mechanism for timepieces having time indicating members moved by a wheel train normally connected to a speed regulating member, a power driven driving member for said time indicating members, a coupling member movable for disconnecting the speed regulating member from the time indicating members whereby to permit said driving member to move the time indicating members independently of the speed regulating member, a train of wheels between said driving member and the time indicating members, a movable support carrying one of the wheels of the train, means operable upon disconnection of the speed regulating member and cooperating with said coupling member for moving said support to have said wheel mesh with one or the other of two wheels of the train which turn in opposite direction and to thereby make the time indicating members move in one or the other direction.

9. In setting mechanism for timepieces having time indicating members moved by a wheel train normally connected to a speed regulating member, a power driven driving member for said time indicating members, a coupling member movable to disconnect the speed regulating member from the time indicating members, and operating means for actuating said coupling member, said operating means including a resilient wall forming a part of the time piece casing and actuating said coupling member upon being deformed.

10. In setting mechanism for timepieces having time indicating members moved by a wheel train normally connected to a speed regulating member, a power driven driving member for said time indicating members, a coupling member movable to disconnect the speed regulating member from the time indicating members, operating means for moving said coupling member, said operating means including a resilient wall mounted within the timepiece, cam means operable from the exterior of the timepiece to deform said resilient wall, cam means mounted on the timepiece internally of said resilient wall and operatively connected to said coupling member, and means on the wall engaging said second mentioned cam means whereby said coupling member is moved upon deformation of said wall.

11. In setting mechanism for timepieces, time indicating members, a train of wheels operatively connected to said members, two driving wheels adapted to alternately actuate said train of wheels, a speed regulating device operatively connected to one of said driving wheels, a coupling device normally connecting said train of wheels to that one of the two driving wheels connected to the speed regulating member, and operating means for actuating said coupling device to temporarily disconnect said train of wheels from the driving wheel connected to the speed regulating member and to engage said train with the other of said driving wheels.

12. In setting mechanism for timepieces having a motor driven wheel train actuating time indicating members normally connected to a speed regulating member, a supplemental motor, and coupling means operable to disconnect the time indicating members from the speed regulating member and for connecting the supplemental motor to the time indicating members.

ALEXANDRE BUGNION.
EDMOND DÉGALLIER.